G. R. SMITH.
REVERSING GEAR FOR ENGINES.
APPLICATION FILED APR. 7, 1919.
1,370,924.
Patented Mar. 8, 1921.
2 SHEETS—SHEET 1.
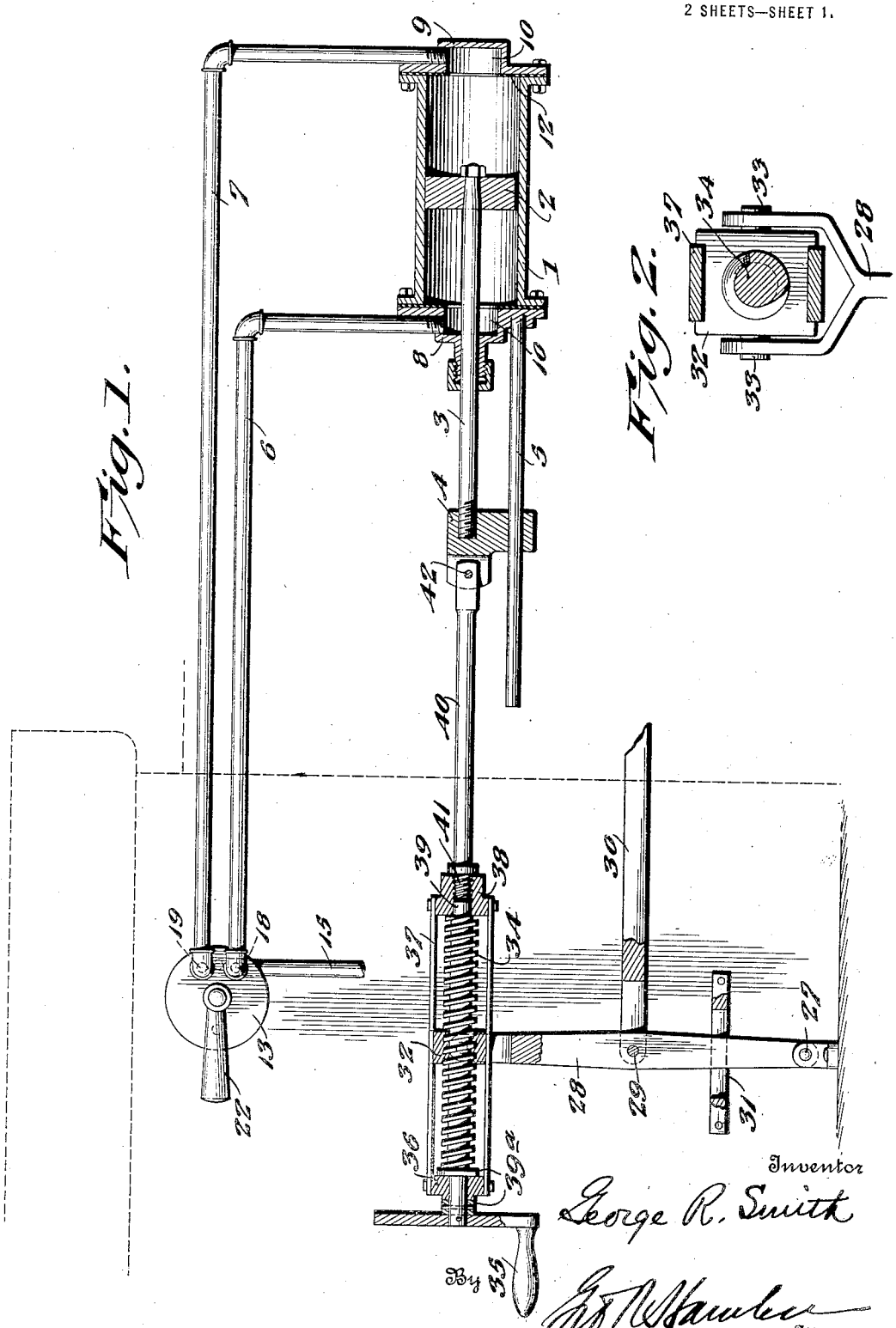
Inventor
George R. Smith
By
G. N. Hamler
Attorney G. R. SMITH.
REVERSING GEAR FOR ENGINES.
APPLICATION FILED APR. 7, 1919.
1,370,924.
Patented Mar. 8, 1921.
2 SHEETS—SHEET 2.
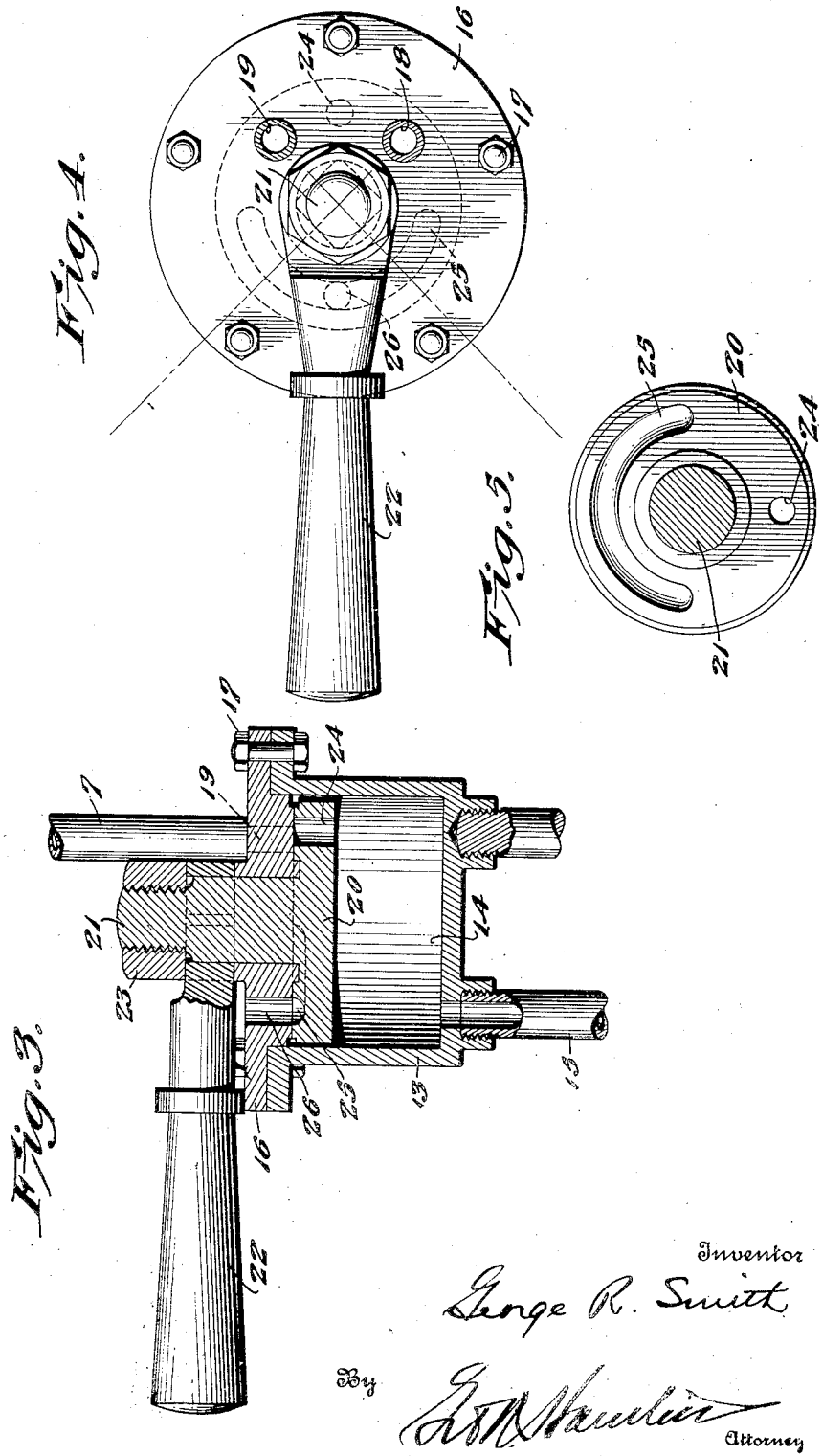

UNITED STATES PATENT OFFICE.

GEORGE R. SMITH, OF NORFOLK, VIRGINIA.

REVERSING-GEAR FOR ENGINES.

1,370,924.   Specification of Letters Patent.   Patented Mar. 8, 1921.

Application filed April 7, 1919. Serial No. 288,056.

*To all whom it may concern:*

Be it known that I, GEORGE R. SMITH, a citizen of the United States, residing at 123 College Place, in the city of Norfolk and State of Virginia, have invented certain new and useful Improvements in Reversing-Gears for Engines, of which the following is a specification.

This invention relates to those reversing gears for marine and locomotive engines which employ a piston and cylinder, and motive fluid pressure, such as compressed air, for effecting reversal, relieving the engineer of the manual effort in shifting the reversing gear which, in the usual link motion, is not a light task.

My object is to provide improvements comprising a combined power and hand-operated reversing mechanism, whereby power may be used to effect reversal, and a hand-operated mechanism then operated, independent of the power operation, to obtain a suitable and accurate adjustment of the mechanism controlling the distribution of steam to the cylinders of the engine being controlled.

My improvements contemplate, still further, the utilization of a novel hand operable adjusting mechanism which may be employed at any time, without regard to the position of the piston of the power operated reversing means, to effect such adjustment or reversal of the valve motion as the engineer may desire.

My improvements are adapted to prevent creeping of the piston of the power operated mechanism, after it has been set in the desired position to effect the desired result in the reversing mechanism, thereby overcoming a disadvantage heretofore inhering in piston-and-cylinder operated reversing means for marine and locomotive engines.

My power and hand operated reversing mechanisms are so correlated that reversal of the engine may be obtained by using the power operated means, independent of the position and condition of the hand operated means, and vice versa, whereby the combined mechanisms are adapted for operation and setting to meet all conditions encountered in the reversal and setting of the valve motion of the steam engine.

I am aware that modifications might be resorted to in carrying out my invention and wish it understood that the disclosure hereinafter given and which appears in the accompanying drawings is to be considered within the scope of the appended claims as illustrative, rather than restrictive, of the invention.

In the accompanying drawings,

Figure 1 is a partly side elevation, partly sectional view of the complete invention, dotted lines representing diagrammatically the installation of the controlling means in the cab of a locomotive;

Fig. 2, is a detail cross-section of the connection between the rocker and the adjusting screw;

Fig. 3, is a detail section through the controlling valve;

Fig. 4, is a plan view thereof; and

Fig. 5, is a detail plan view of the valve disk.

The invention is illustrated in connection with a locomotive, but it is as well adapted for use on a marine, or any other engine.

Within the power cylinder 1 is a piston 2 having piston rod 3 connected to a cross head 4 slidable on a guide 5. The reversal or control of the valve motion, such as the usual link motion, is effected by the movements and position of the piston 2 in the cylinder 1.

Motive fluid pressure such, for instance, as compressed air, is admitted to the respective ends of the cylinder 1 by pipes 6 and 7, the cylinder heads 8 and 9 have chambers 10 to enable the piston 2 to travel to the ends of the cylinder and still be subject to the pressure, either of the compressed air or the atmosphere. To prevent leakage I prefer to provide rawhide or other gaskets 11, 12 lying against the inner faces of the cylinder heads. The cylinder heads are preferably bolted to the cylinder to enable them to be readily removed.

The admission and exhaust of the compressed air, in respect to the cylinder 1, is under control of a valve 13 which is conveniently located for use by the engineer as, for instance, in the cab, if the invention is used on a locomotive. The valve 13 has an air chamber 14 which is constantly open to a suitable source of compressed air as, for instance, supplied through a pipe 15. The valve bonnet or cap 16 is suitably secured to the valve casing by bolts 17. At two different points, the bonnet is provided with ports 18, 19 to which the pipes 6, 7 are suitably connected. A valve disk 20 is located within the valve casing 13 and fits against the inner face of the bonnet or cap 16. The stem 21 of the valve disk is journaled in the bonnet and provided with a handle 22 which is secured in any suitable manner as, for instance, by a nut 23 which also holds the valve disk 20 against the inner face of the bonnet 16. The valve disk 20 has a port 24 which is adapted to register with either of the ports 18, 19, and to thereby permit the compressed air in the chamber 14 to have access to one end or the other of the cylinder 1, according to the position of the handle 22. The air pressure in air chamber 14 holds the valve 20 against the cap or bonnet 16 and prevents leakage. In the upper face of the valve 20 is an arc-shaped channel 25 which is adapted to connect either one of the ports 18, 19 with an exhaust port 26. When the handle 22 is turned in one direction, one of the ports 18, 19 will be placed in communication with the port 24, the other port, 18, 19, being then in communication with the port 24. Thus, while one end of the cylinder 1 receives pressure, the other end is open to the atmosphere. If, however, the handle Le placed in a neutral position, the port 24 will lie between the ports 18, 19 and no movement of the piston will result, or, the piston will be retained in the position it may have assumed.

Suitably pivoted at 27 is a lever or rocker 28 to which is pivoted at 29 a connecting rod 30 which is attached in any suitable manner to the reversing valve motion used on the particular engine on which the invention is employed. Suitable stops, or a slotted plate 31, may be employed to limit the movement of the rocker 28 to prevent injury to the parts in case the mechanism happens to be so arranged that application of air to the cylinder 1 would cause too great travel of the rocker 28.

Carried by the upper end of the rocker 28 in an internal screw-threaded nut or collar 32 whose trunnions 33 are journaled in the rocker. A coarse screw 34 is engaged with the collar or nut 32 so that on turning said screw the collar or nut will be fed therealong and the rocker 28 moved, and with it the connecting rod 30 shifted. At one end the screw 34 carries a suitable crank or hand wheel 35 and is journaled in a head 36 or a cage 37 which carries at its other end a head 38 in which the blank end 39 of the screw 34 is journaled in the form of a thrust bearing. Suitable collars 39ª on the screw retain it against longitudinal movement in the collar or head 36. A connecting link 40 is screwed into the head 38 at 41 and pivoted at 42 to the cross head 4, thereby establishing an operative connection between the piston 3 and the rocker 28.

The screw 34 and collar 32 constitute an adjustable, self-locking, feed or adjustment by which the rocker 28 can be manually adjusted, one way or the other, to effect a desired setting of the reversing valve motion, either after the piston 2 has been moved by the application of air pressure, or, independently of the position of the piston 2 and the application of any air pressure thereto. Consequently, the invention embodies, first, a power operated reversing mechanism; second, a hand operated reversing mechanism; third, a combined power and hand operated reversing mechanism.

The screw 34 and nut 32 constitute a cut-off mechanism by which the valve action may be set or controlled in any desired manner, either for reversing the engine or for regulating the travel of the valve and the cut-off of the steam.

Unlike combined hand and power operated reversing mechanisms heretofore known to the art, in my improvements the hand adjustment of the cut-off rod 30 is effected without having to shift the piston 2 by said hand adjustment. Consequently, and particularly because of the use of a screw feed, hand adjustment is very quickly and easily effected.

What I claim is:

1. In a combined power and hand operated reversing and controlling mechanism for engines, a piston and cylinder comprising motive fluid pressure operated means, controlling means therefor, a connection for effecting reversing and cut-off, and a hand operated adjusting device constituting an adjustable intermediate connection between the movable element of the piston and cylinder and the said reversing connection whereby the said hand operated adjusting device may be normally operated independently of the motive fluid pressure operated means, to effect control or reversing without having to manually shift the piston.

2. In a combined power and hand operated reversing and controlling mechanism for engines, the combination of a piston and cylinder, a valve controlling the admission of the motive fluid pressure to the piston and cylinder, a movable member, a reversing and cut-off connection between the said movable member and the engine, and a hand operated screw constituting an adjustable connection between the movable member and the movable element of the piston and cylinder, to effect manual control or reversing without having to manually shift the piston.

3. In a combined power and hand operated reversing and controlling mechanism for engines, the combination of a piston and cylinder, a valve controlling the admission of the motive fluid pressure to the piston and cylinder, a rocker, a connecting rod attached to the rocker and constituting an operative connection between it and the engine, a screw connected to the movable element of the piston and cylinder, said screw having means for turning it by hand, and a nut or collar carried by the rocker and engaged with the screw, whereby the rocker is connected by the screw and nut to the movable element of the piston and cylinder and may be moved by hand adjustment independently of the operation of the piston and cylinder and without having to shift the piston manually.

4. In a combined power and hand operated reversing and controlling mechanism for engines, the combination with motive fluid pressure operated means, of a rocker, an operative connection between the rocker and the engine, means for limiting the swing or movement of said rocker in both directions, and a hand operated adjustable connection between the rocker and the movable element of the motive pressure operated means.

In testimony whereof I affix my signature.

GEORGE R. SMITH.